United States Patent
Treadwell et al.

(10) Patent No.: US 7,683,335 B2
(45) Date of Patent: Mar. 23, 2010

(54) THRESHOLD CERENKOV DETECTOR WITH RADIAL SEGMENTATION

(75) Inventors: Elliot Allen Treadwell, Tallahassee, FL (US); Ely Ivan Leon, Tallahassee, FL (US)

(73) Assignee: Florida Agricultural and Mechanical University, Tallahassee, FL (US)

( * ) Notice: Subject to any disclaimer, the term of this patent is extended or adjusted under 35 U.S.C. 154(b) by 305 days.

(21) Appl. No.: 11/724,218

(22) Filed: Mar. 15, 2007

(65) Prior Publication Data

US 2008/0224052 A1    Sep. 18, 2008

(51) Int. Cl.
    *G01T 1/22*    (2006.01)
(52) U.S. Cl. .................. 250/368; 250/361 R; 250/372; 250/373
(58) Field of Classification Search .............. 250/207, 250/361 R, 367, 368, 372, 374
    See application file for complete search history.

(56) References Cited

OTHER PUBLICATIONS

Ciljak, M., I. Dedorko, S. Tokar, A. Antonaki, V. Giakoumopoulou, N. Giokaris, and A. Manousakis. "Design of a Cylindrical Cerenkov Detector." J. Phys. D: Appl. Phys. 37 (2004) 2283-2290.*

Ullaland, O. "Update in Particle Identification." Nuclear Physics B (Proc. Suppl.) 125 (2003) 90-99.*

Dai, X., E. Rollin, A. Bellerive, C. Hargrove, D. Sinclair, C. Mifflin, and F. Zhang. "Wavelength Shifters for Water Cherenkov Detectors". Nuclear Instruments and Methods in Physics Research A 589 (2008) 290-295.*

* cited by examiner

*Primary Examiner*—David P Porta
*Assistant Examiner*—Casey Bryant
(74) *Attorney, Agent, or Firm*—Norris, Melton & Gregersen, PLLC

(57) ABSTRACT

Threshold Cerenkov Detector With Radial Segmentation permits correlation between number of photons produced in concentrically arranged radiator tubes and particle momentum that yields a 90% confidence level for e, $\mu$, $\pi$, and p identification up to 4-5 GeV/c or four to five times greater than the momentum limit for particle identification in Threshold Cerenkov Detectors, wherein detector has three concentric cylinders with a total of 25 radiator tubes, each cylinder of tubes has different medium; and four scintillators are employed which trigger cosmic particles within a window of 5ns. Radiator designs produce more photons as particles enter improved TCDRS design and fewer photons as they leave. Correlation between the number of photons produced in the tubes and the particle momentum yields about a 90% confidence level for e, $\mu$, $\pi$, and p identification up to 4-5 GeV/c times greater than the momentum limit for particle identification using existing Threshold Cerenkov Detectors.

8 Claims, 13 Drawing Sheets

Cerenkov Radiation:

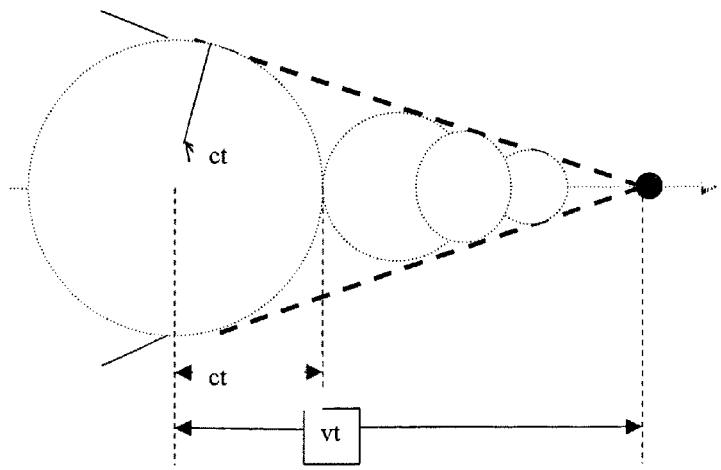

The half-angle $$\cos(\theta_c) = \frac{1}{\beta n}$$

Threshold velocity ($\beta_t$):

$$\beta_t = \frac{1}{n}$$

$$\gamma_t = \frac{1}{\sqrt{(1-\beta_t^2)^{1/2}}}$$

The energy lost to Cerenkov radiation [The Frank and Tamm equation].

$$\left(\frac{dE}{dx}\right)_{rad} = \frac{(Ze)^2}{c^2} \int w\left(1 - \frac{1}{\beta^2 \varepsilon(\omega)}\right) d\omega$$

- the n($\omega$) has a dispersive nature which depends on the frequency of oscillation of
- the valence atomic electrons in the medium.

the $\beta\, n(\omega) > 1$ the speed of the particle must be greater than the phase velocity of the electromagnetic fields at frequency ($\omega$).

FIG. I

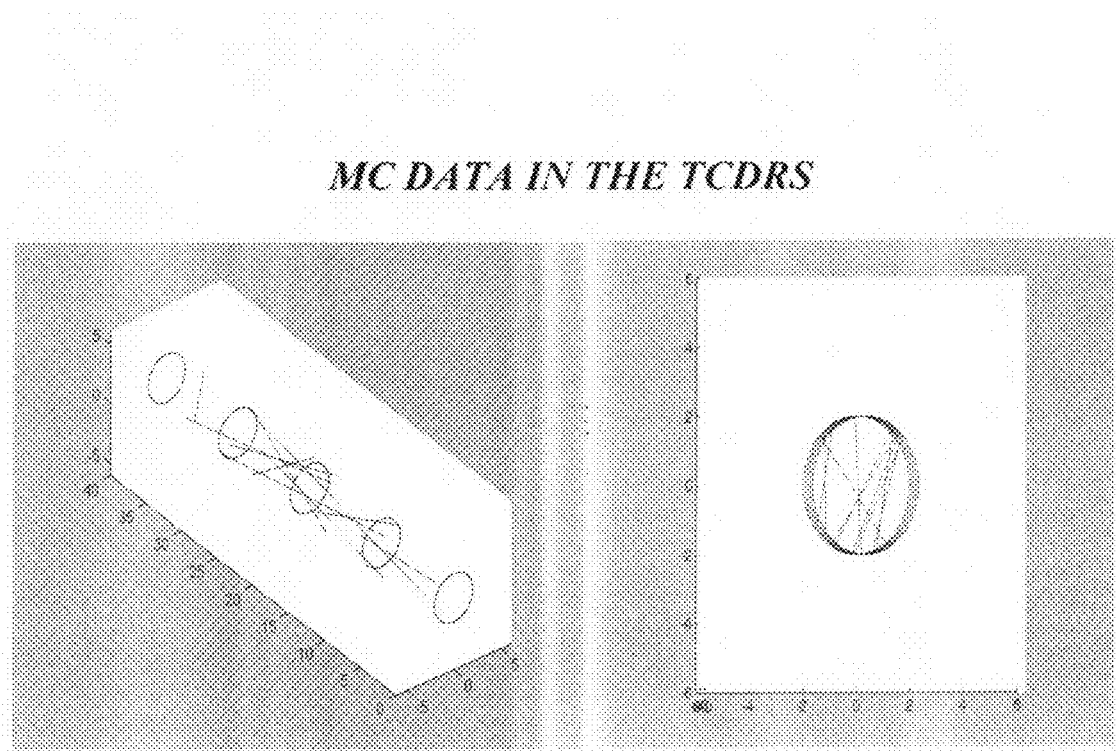
MC DATA IN THE TCDRS
A. MC of track data in a radiator tube. Using 10,000 events we obtain an average track length of 14.4 cm and 2 photons/cm.
B. MC data for the Number of Photons / Energy · Length versus Track Momentum
FIG. II

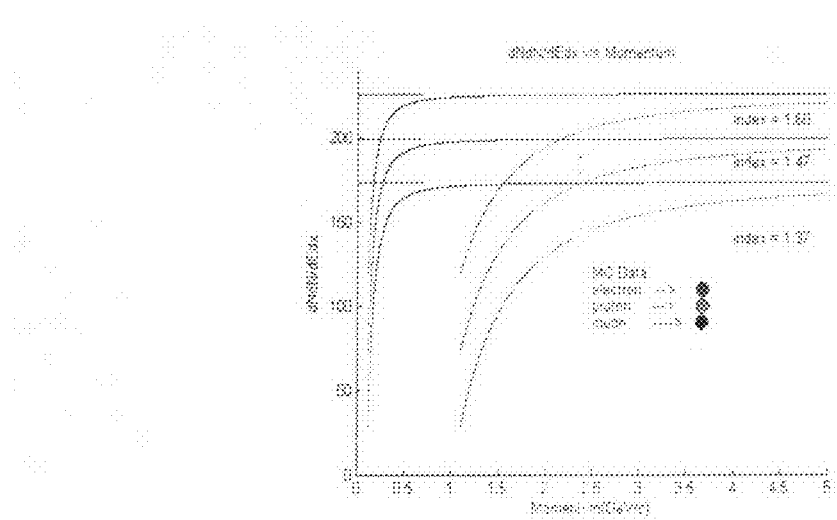
EXPERIMENTAL DATA
Experimental raw data where collected at the laboratory for a period of 27 hours at the rate of 20 events per minute : 1 M events
ANALYSIS STREAM
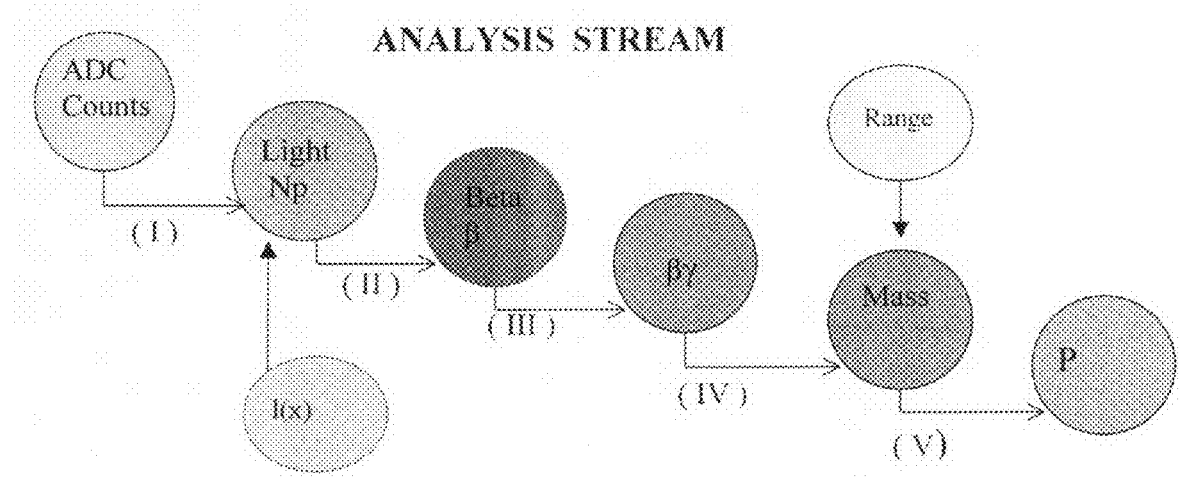
FIG. III

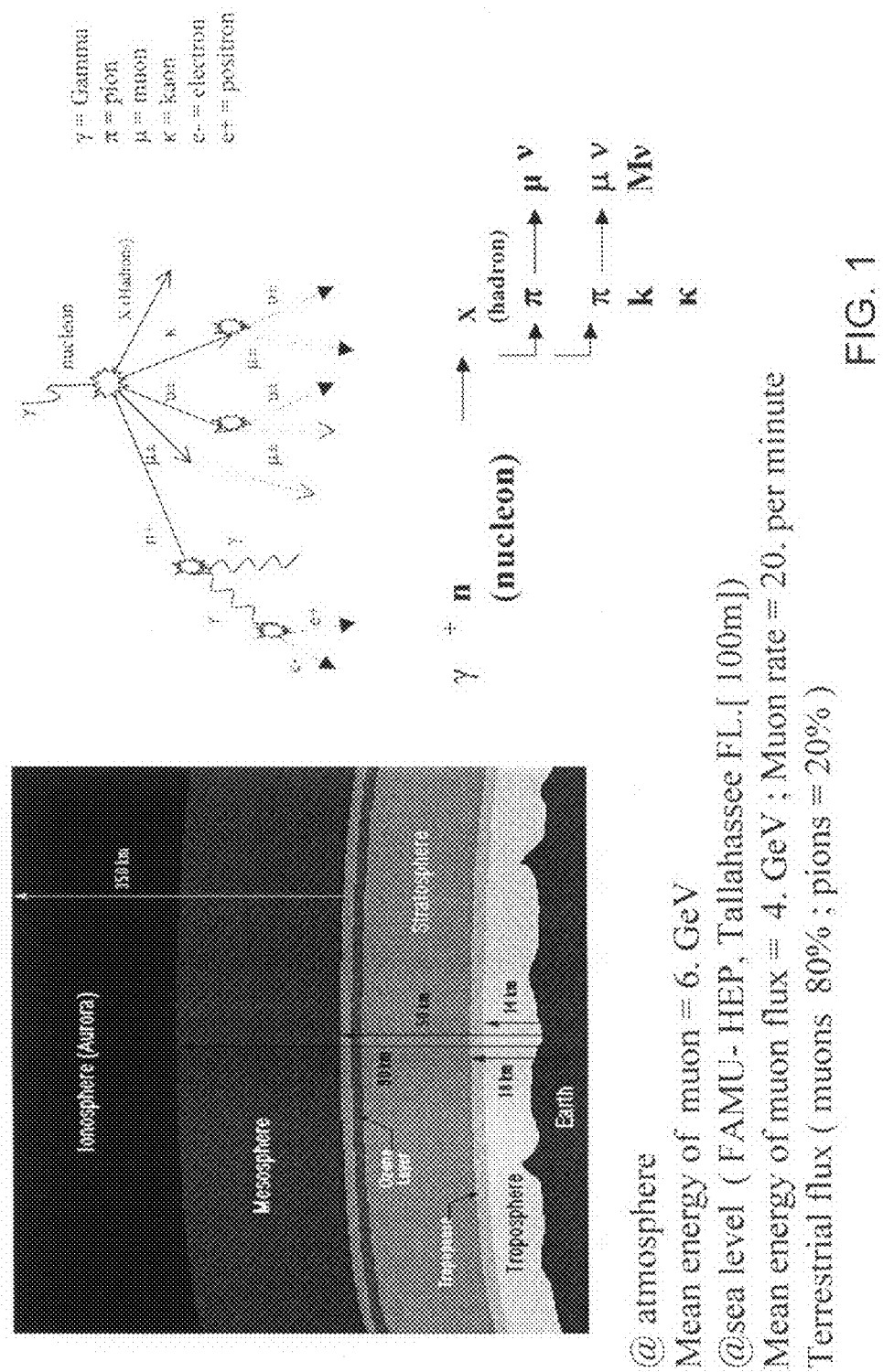

RADIATOR DESIGN
Design #1
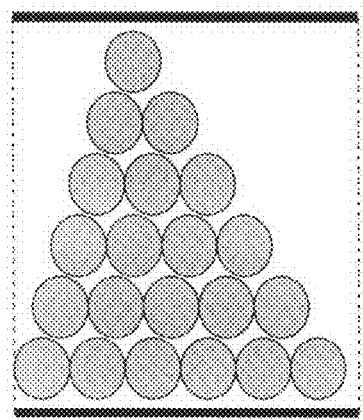
Design # 2
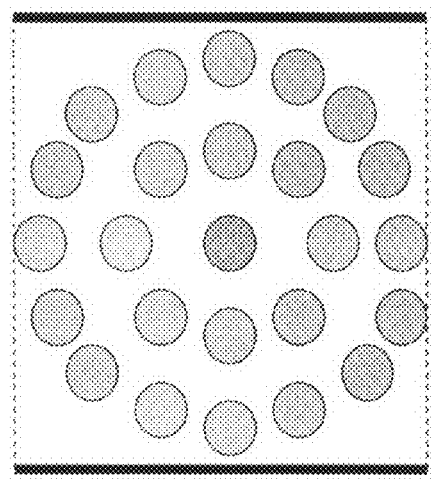
MC Striked tubes
Events ( 2560 )
$ó1 = 4 \pm 1.443$
$ó2 = 4 \pm 1.6222$
$ó3 = 4 \pm 1.5407$
Design # 3
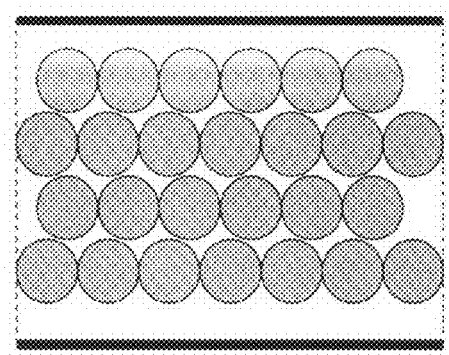
FIG. 2

Hardware

- 4 Plastic Scintillators: for triggering

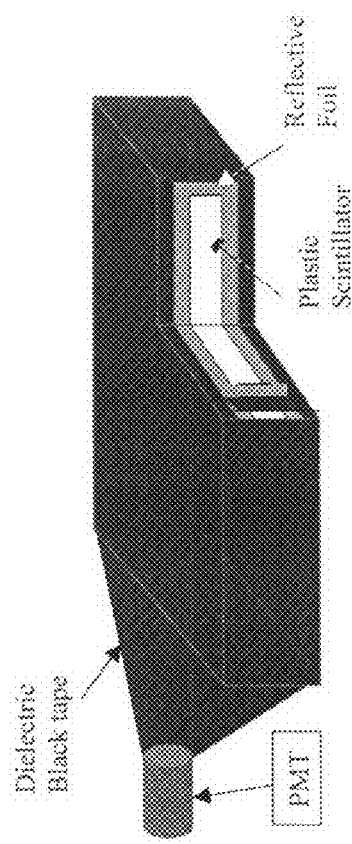

Chemical Base = Polyvinyltoluene
Density = 1.032 g/cc
Index of Refraction = 1.58
Light output = 64 % at
Light attenuation length = 210 cm BC-480 (39.4" x 13.4" x 0.25")

- 29 Photomultiplier tubes: Radiator
  (1= mineral oil+wls; 8 = mineral oil; 16 = $H_2O$+wls)

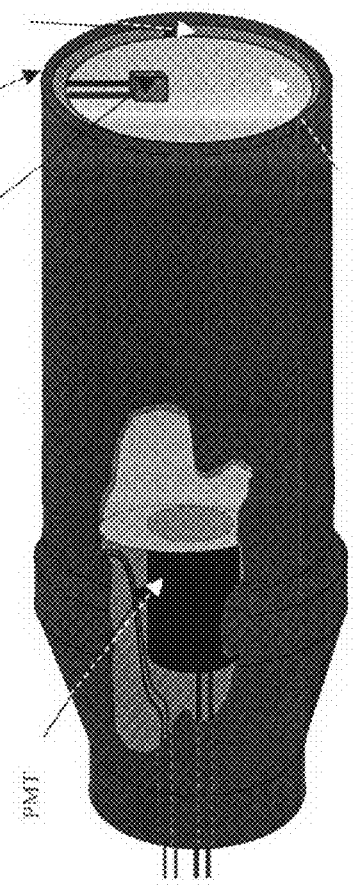

MINERAL OIL: (MiniBooNE experiment @ FERMI)
Hydrobrite 380; Ruger chemical
Component = White mineral oil mist
type = TWA (mist)
Refractive index @ 25C = 1.47

WAVELENGHT SHIFTER (WLS):
$C_{10}H_8O_3$
Flouresence Compounds
[7-Hydroxy-4-methylcoumarin 7%]

FIG. 3

THRESHOLD CERENKOV DETECTOR WITH RADIAL SEGMENTATION

FIELD OF THE INVENTION

The invention pertains to the Threshold Cerenkov Detector with Radial Segmentation (TCDRS) that permits a correlation between the number of photons produced in concentrically arranged radiator tubes and particle momentum that yields a 90% confidence level for e, µ, π, and p identification up to 4-5 GeV/c or four to five times greater than the momentum limit for particle identification in presently used threshold Cerenkov detectors.

BACKGROUND OF THE INVENTION

Gamma rays from violent supernovae explosions interact with atoms in the upper atmosphere of the earth. Primary gamma-nucleon interactions produce relativistic pions, and kaons which travel over 120 km before decaying into neutrinos and muons. The relativistic muons, or cosmic rays, minimally interact with matter and often travel through the Earth. Cosmic ray studies reveal that 80% of the particles which reach terrestrial levels are muons. FIG. 1 is a graph showing stratifications of the atmosphere from the ionosphere to the earth where approximately 80% of the cosmic particles that reach terrestrial levels are muons.

The goal of experimental high energy physics is to identify the fundamental constituents of matter through measurement of the particle velocity, momentum, and energy loss due to ionization of atoms in the detector medium. Cerenkov detectors use ultraviolet photons from the Cerenkov effect and the index of refraction of the detector medium to determine particle velocity. Electromagnetic or hadronic calorimeters are used to identify particle mass and the ionization energy loss in the particular detector medium. We present the Threshold Cerenkov Detector with Radial Segmentation (TCDRS) which is designed to measure the particle velocity, mass and consequently the momentum within the same detector volume.

One device that has been useful in particle identification studies is a Cerenkov radiator (FIG. I):

The radiator has a cylinder with windows at both ends and an enclosed pressurized gas chamber. A charged relativistic, subatomic particle enters one window, along the body axis of the cylinder in a direction parallel to the body axis, and passes through the gas so as to produce transient flashes of faint predominantly blue Cerenkov light. The light is a function of the well known Cerenkov relation $\cos\theta = 1/(n\beta)$ where n corresponds to the refractive index of the gas and β corresponds to the velocity of the particle in the medium divided by the speed of light in a vacuum. The light flashes have passed through the opposite end window and reflected at a suitable angle, such as a forty-five degree angle away from the particle path toward a counting device, for example multi-channel ADCs and a data acquisition system.

DESCRIPTION OF THE RELATED ART

"Photomultiplier tube testing for the MiniBooNE experiment" Fleming, B. T. et al. Nuclear Science, IEEE Transactions, June 2002, Vol. 49, Issue 3, part 2, Pgs 984-988. The MiniBooNE experiment is an anti $v_\mu \rightarrow$ anti $v_e$ oscillation search designed to confirm or rule out the neutrino oscillation signal seen by the LSND experiment at the Los Alamos National Laboratory. The MiniBooNE detector, a 12 m sphere filled with mineral oil and lined with 8-in Hamamatsu photomultiplier tubes (PMTs), uses Cerenkov imaging to identify positrons from anti $v_\mu \rightarrow$ anti $v_e$ oscillations. PMTs, the main detector component underwent calibration tests and dark noise tests to minimize experimental errors and instrumental biases.

A possible application of a detector for distinguishing between pions and kaons, in the range of a few GeV/c is disclosed in "*Design of a cylindrical Cerenkov Detector*" M. Ciljak et al., J. Phys. D: Appl. Phys. 37, pgs. 2283-2290.

The detector design could be used for the experimental B-physics study with the upgraded collider detectors at the Fermilab Tevatron. Simulation methods were used to find the response of several configurations of such a detector as a function of the incident pion and kaon energies in the energy range of several GeV. A straightforward configuration based on conventional materials could work.

U.S. Pat. No. 4,564,753 disclose a detector for the detection of Cerenkov radiation that includes an entrance screen (5) which may cover more than half of an envelope (1); the majority of the envelope is preferably spherical. A photoelectron detecting exit screen (11) is proportioned and arranged inside the envelope (1) so that a small decay time and a high sensitivity are achieved. A scintillant exit screen (11), which is mounted on an indentation (15) in the envelope (1), can produce, in conjunction with a photomultiplier tube (17) mounted inside the indentation (15), a photoelectric intensification by a factor 100.

GB 1355815 uses detecting polymer compositions as a method of detecting charged particles from the Cerenkov effect. Charged particles impinge on a solid detector body/ light transmitting material having an exposed edge through which light pulses may be observed and having inherent negligible or readily quenchable scintillation characteristics and containing dispersed through the base material from one percent to thousands of a percent (by wt.) of at least one wavelength shifting luminescent material which in use in the Cerenkov detector absorbs Cerenkov radiation and re-emits at a higher visible wavelength and in the case that the solid light transmitting material has a readily quenchable scintillation characteristic, a scintillation quencher. Preferred ranges are up to 0.025% or 0.025 to 0.0065% by wt. Detection may be by photocells.

U.S. Pat. No. 3,718,818 discloses a device for determining the energy of electrically charged particles emanating from a particle accelerator such as a Betatron used for radiation therapy that includes a gas interval traversed by the accelerated particles for producing a Cerenkov radiation whose optical index of refraction is variable. First and second adjacently located detectors are disposed in the path of Cerenkov radiation, both of these detectors being exposed to the same dispersed and secondary particle radiation but one detector being shielded from the direct Cerenkov radiation. The respective outputs from the detectors are led through amplifiers whose amplification factors are adjustable into a difference meter, and the output of the difference meter is applied to a measuring instrument.

A differential Cerenkov detector is used to determine the velocity and direction of individual, charged, nuclear particles of different velocities and directions, comprising a cylindrical container forming a closed chamber, a gas in said chamber, means for selectively adjusting the pressure of said gas so that the gas has an index of refraction greater than unity, means for introducing particles into the gas to produce Cerenkov light in the gas having dominant wavelengths from 0.2 to 0.5 micron, a mirror for reflecting the light and a lens having a broad field of view for focusing the Cerenkov light into individual images of light in the focal plane of the lens, the size and position of the ring images corresponding respectively to the velocity and direction of the particles, is disclosed in U.S. Pat. No. 3,140,394.

German Patent No. DE10135092 discloses optical fibers (3) forming a single film (2) of optical fibers that make up a large detection area measurement sensor (4). The sensor can detect the whole cross section of a particle beam. Measurement of the total intensity in the optical fibers are linked to a common photo-detector (10), while for spatially resolved measurement an intensity profile is generated by linking each optical fiber to a separate photo-detector CH691006 discloses detection and analysis of the interaction of gamma and x-rays involving interacting the rays and viewing the resulting image to give good image quality. Detection and analysis of the interaction of gamma and x-rays involves interacting the rays and viewing the resulting image. The detector used in the process comprises a converter producing high energy electrons using the Compton effect, a photon emitter using the Cerenkov effect and a detector sensitive to photons and a radiography apparatus with a detector with a charge transfer device or a matrix of photosensitive elements and coupled with a mirror, an object and a Cerenkov emitter or wavelength shifter.

The new generation of Cerenkov detectors must provide $4\pi$ photon detection efficiency; and accurate measurement of the particle momentum. This level of improvement will raise the confidence level for e, $\mu$, $\pi$, and p identification beyond 90% and raise the momentum limit for particle identification more than five times the current value for threshold Cerenkov detectors.

There is a further need for improvement of current Cerenkov detectors to enable ionization energy loss measurements in the detector volume.

None of the references disclose a TCDRS design comprising a radiator that contains three concentric rings with different dielectric medium of:

1) water plus wavelength shifter;
2) mineral oil; and
3) mineral oil plus wavelength shifter.

SUMMARY OF THE INVENTION

One object of the invention is to provide an improved Cerenkov detector capable of providing correlation between the number of photons produced and particle momentum yields to improve the confidence level for e, $\mu$, $\pi$, and p identification to a level greater than the momentum limit for particle identification using state of the art threshold Cerenkov detectors.

Another object of the present invention is to provide an improved threshold Cerenkov detector capable of monitoring the particle tracks as they pass through the detector volume so as to enable sampling of Cerenkov radiation produced by the charged particles and to improve ionization energy loss measurements of the particles inside to detector volume.

In general, improved particle identification is accomplished by the use of a threshold Cerenkov detector with radial segmentation (TCDRS), wherein the detector has three concentric cylinders with a total of 25 radiator tubes. Each cylinder of tubes has a different medium; and four scintillators, two on top and two underneath the detector, are employed to trigger cosmic particles within a window of 5 ns. As such, this radiator design produces more photons as the particles enter the improved TCDRS design and fewer photons as they leave. The correlation between the number of photons produced in the tubes and the particle momentum yields about a 90% confidence level for e, $\mu$, $\pi$, and p identification and momentum saturation limits of up to 4-5 GeV/c. Note, the 5 Gev/c momentum limit is five times greater than the momentum limit for state of the art threshold Cerenkov detectors.

A better understanding of the invention may be obtained by resort to the Brief Description Of The Drawings and Detailed Description Of The Preferred Embodiment Of The Invention.

BRIEF DESCRIPTION OF THE DRAWINGS

FIG. I is a Cerenkov radiator having a cylinder with windows at both ends and an enclosed pressurized gas chamber.

FIG. II shows the MC data in the TCDRS.

FIG. III shows the experimental data collected at a rate of 20 events per minute and the analysis stream.

FIG. 1 is a graph showing the various stratifications of atmosphere from the ionosphere to the earth, where approximately 80% of the cosmic particles known as muons and 20% of the particles result from multiple electromagnetic and strong interactions over 120 km.

FIG. 2 depicts the various radiator designs for the threshold Cerenkov detector with radial segmentation of the invention.

FIG. 3 depicts some of the hardware of the TCDRS, and includes four plastic scintillators and twenty nine photomultiplier tubes.

Figure 4:
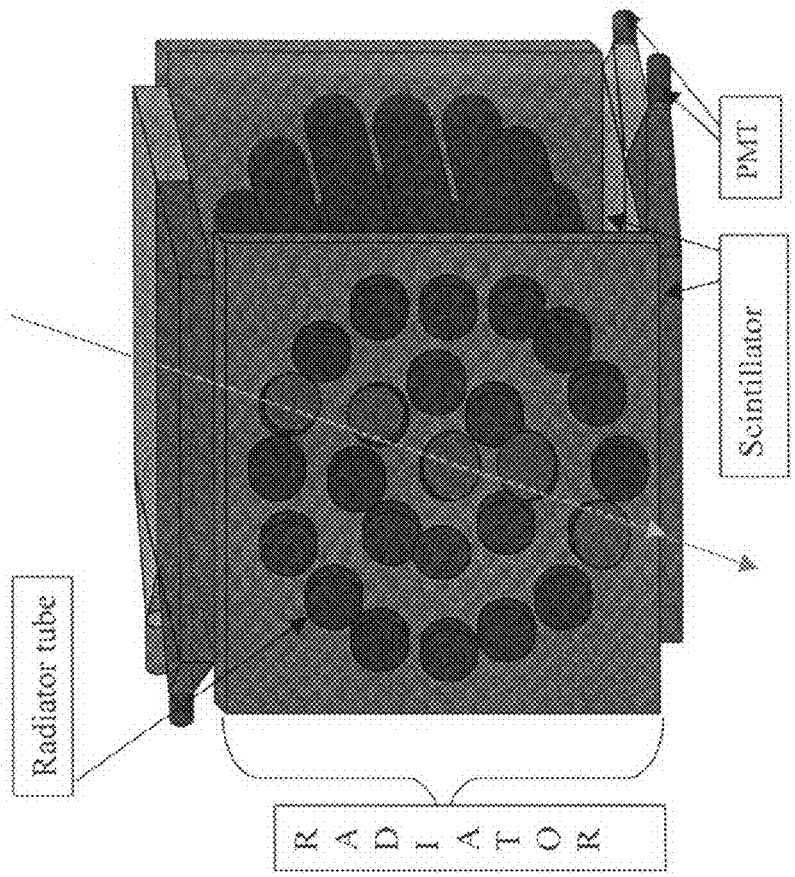

FIG. 4 shows the concentric radiator design system through which data timing and data acquisition take place.

Figure 5:
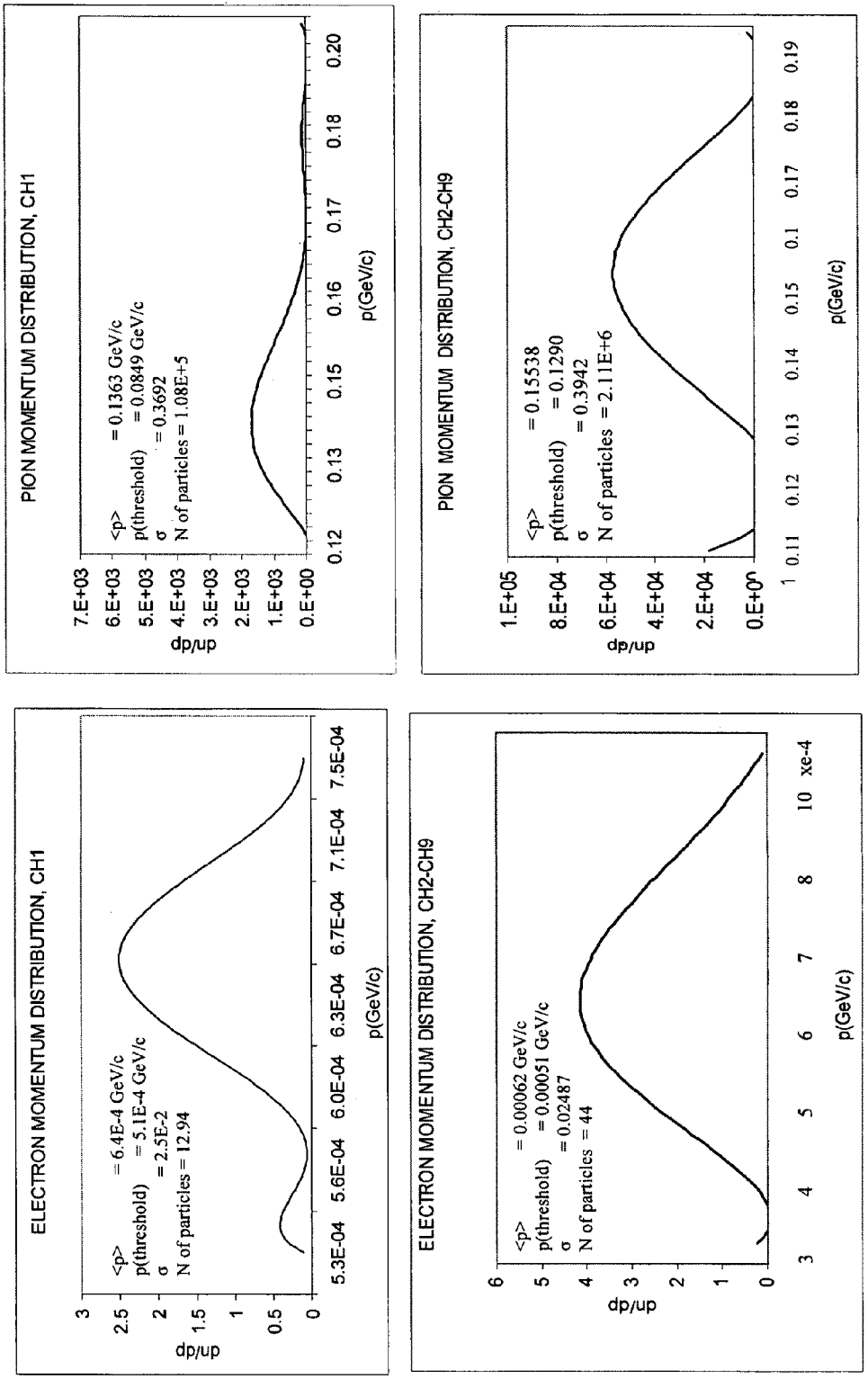

FIG. 5 is a collection of graphs showing detected electron, momentum distribution and detected, pion momentum distribution.

Figure 6:
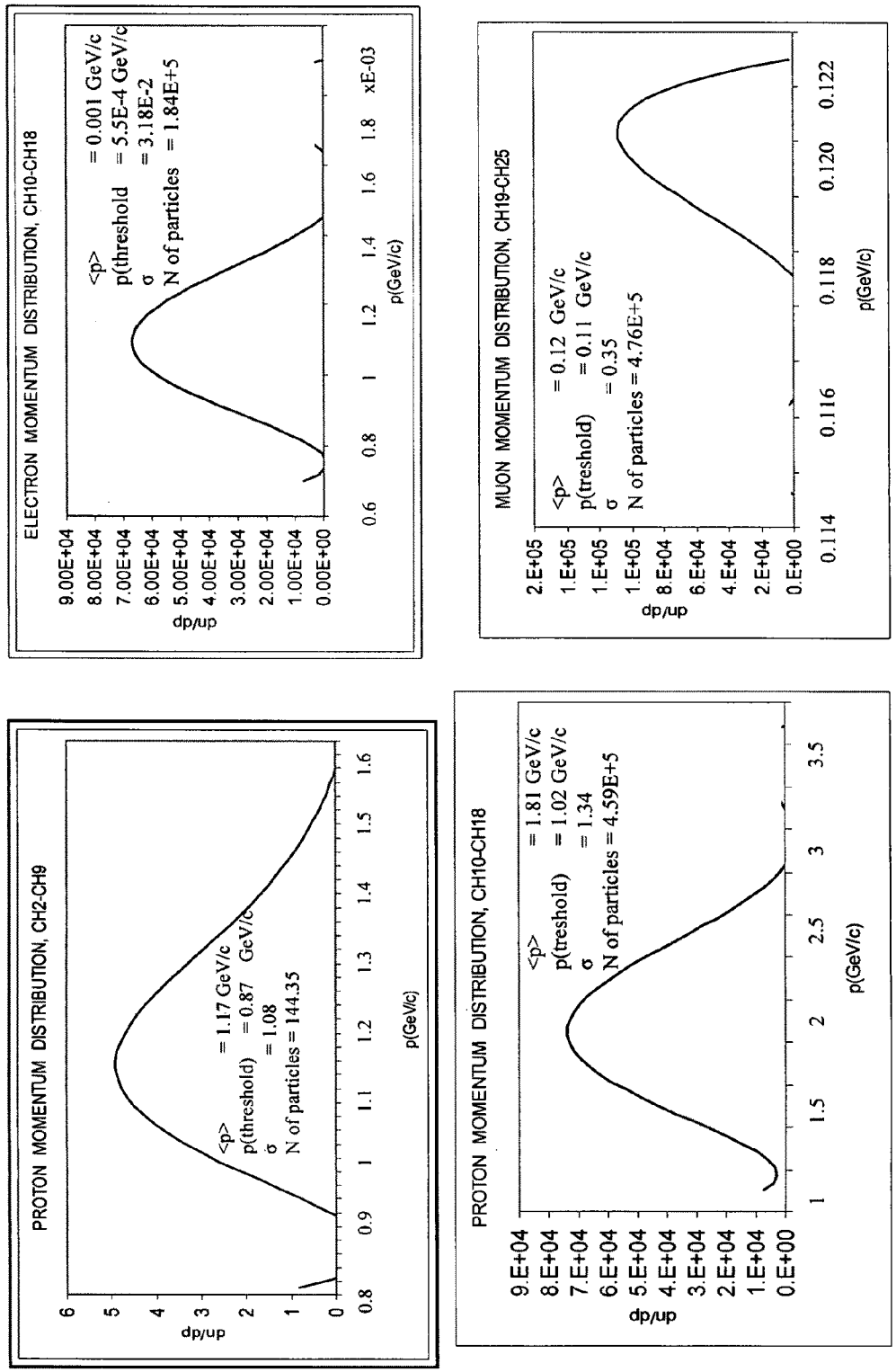

FIG. 6 is a collection of graphs showing detected proton, momentum distribution, detected electron, momentum distribution and detected muon, momentum distribution.

Figure 7:
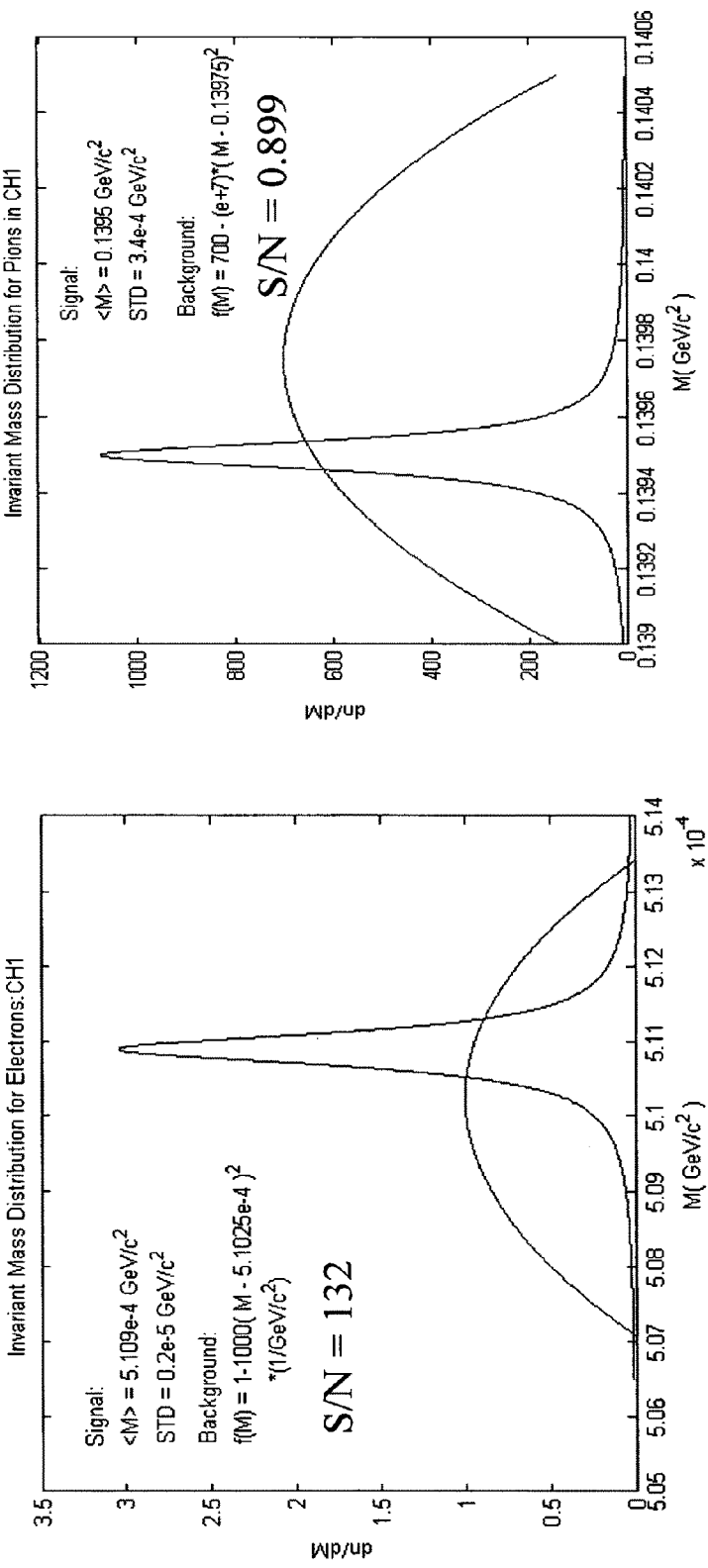

FIG. 7 is a collection of graphs showing invariant mass distribution for detected electrons and detected pions.

Figure 8:
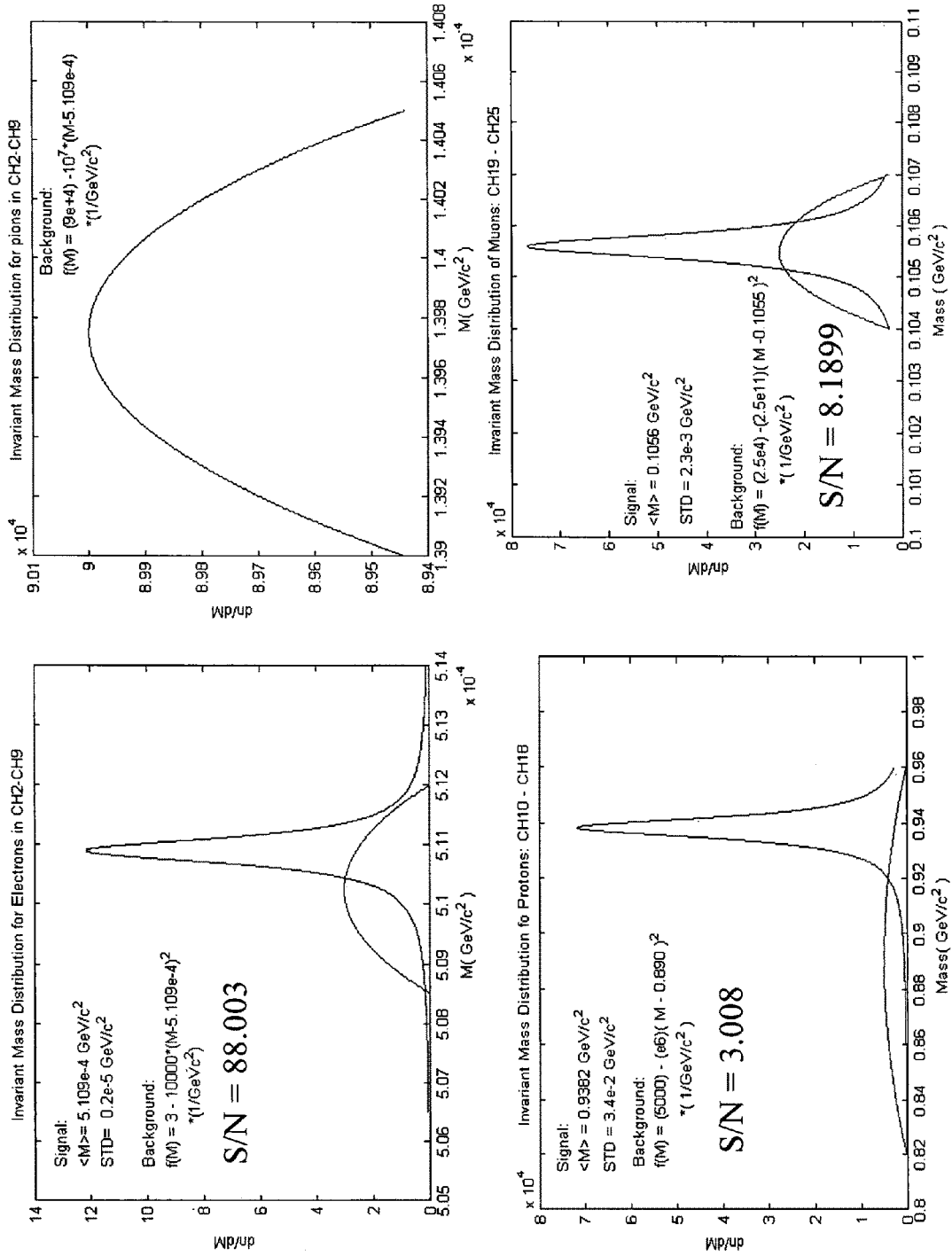

FIG. 8 is a collection of graphs showing invariant mass distribution for detected electrons, protons, pions and muons.

Figure 9:
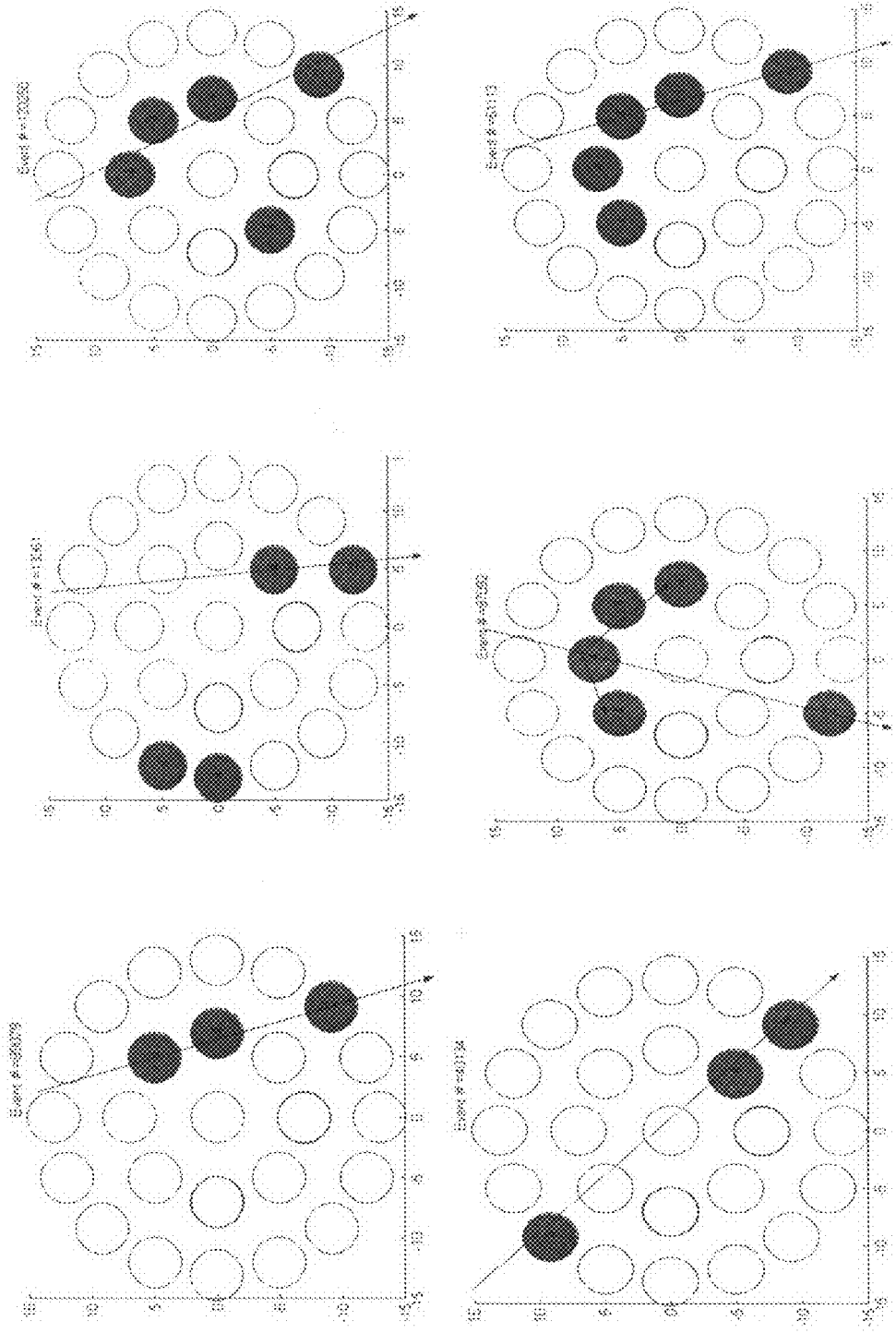

FIG. 9 is a collection of graphs showing event reconstruction or tracking of events for electrons, muons, pions and protons.

Figure 10:
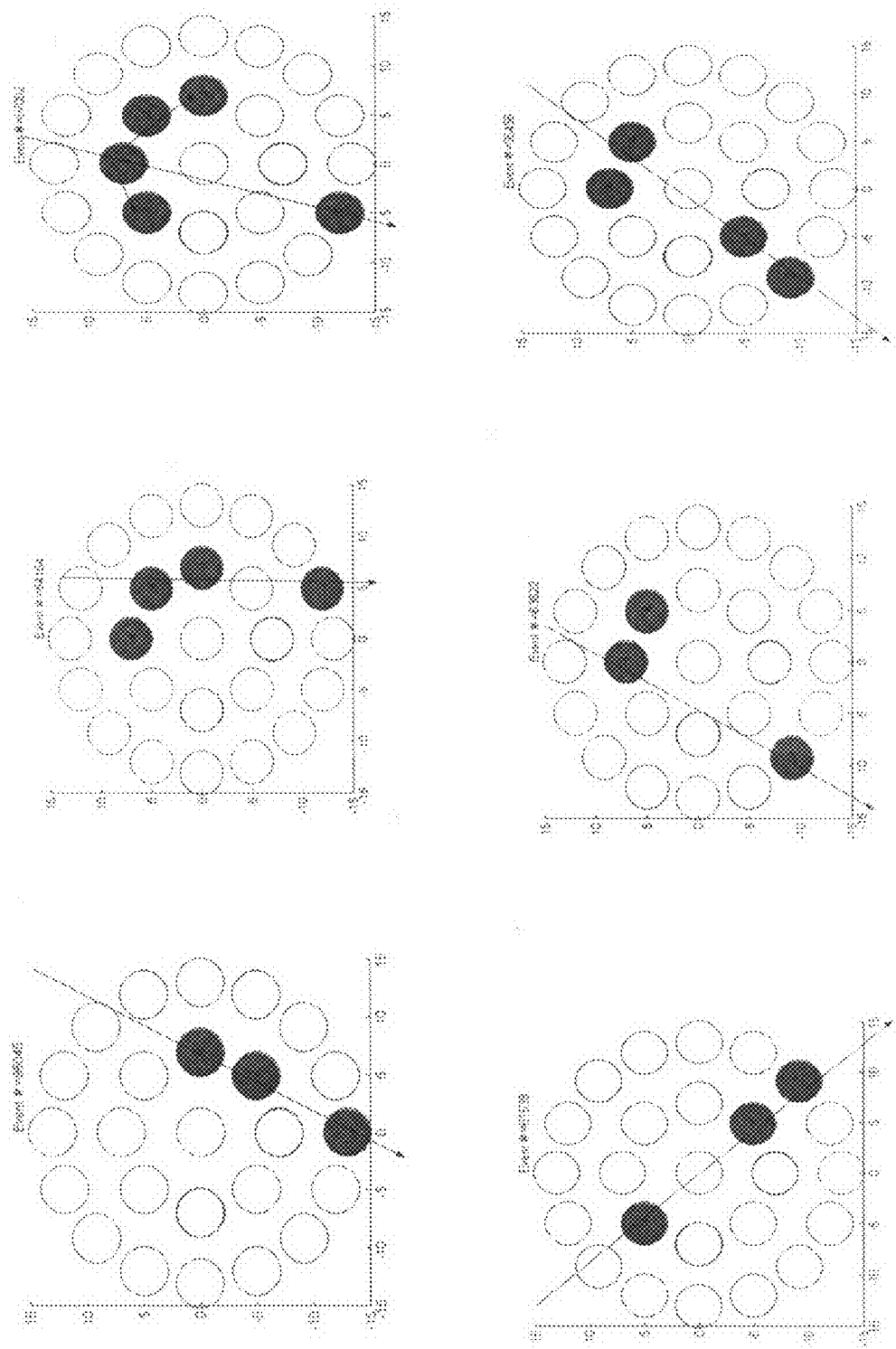

FIG. 10 is a collection of graphs showing tracking of events for electrons, muons, pions and protons in establishment of the results of the TCDRS of the invention.

DETAILED DESCRIPTION OF PREFERRED EMBODIMENT OF THE INVENTION

In general, a charged, relativistic particle enters along the radial direction of the cylinder and through the medium so as to produce blue Cerenkov light. Cerenkov light is ultraviolet radiation; however, the ultraviolet radiation is absorbed by the wavelength shifter and isotropically emitted in the medium as blue light. The Cerenkov light is expressed as a function of n and $\beta$: $\cos\theta = 1/(n\beta)$ where n corresponds to the refractive index of the medium and $\beta$ corresponds to the velocity of the particle in the medium divided by the speed of light in a vacuum.

The Cerenkov radiation is a coherent wakefield: produced by constructive interference of the Electromagnetic waves in the medium. Note, the particle velocity exceeds the wakefield velocity And therefore creates an electromagnetic shock wave.

The Cerenkov light is expressed as a function of n and $\beta$: $\cos\Theta = 1/(n\,\beta)$ as follows:

The half-angle $$\cos(\theta_c) = \frac{1}{\beta n}$$

Threshold velocity ($\beta_t$):

$$\beta_t = \frac{1}{n}$$

$$\gamma_t = \frac{1}{\sqrt{(1-\beta_t^2)^{1/2}}}$$

The energy lost to Cerenkov radiation [The Frank and Tamm equation].

$$\left(\frac{dE}{dx}\right)_{rad} = \frac{(Ze)^2}{c^2} \int w\left(1 - \frac{1}{\beta^2 \varepsilon(\omega)}\right) d\omega$$

the $n(\omega)$ has a dispersive nature which depends on the frequency of oscillation of the valence atomic electrons in the medium.

the $\beta n(\omega) > 1$ the speed of the particle must be greater than the phase velocity of the electromagnetic fields at frequency ($\omega$).

The preferred radiator arrangement for the improved Cerenkov detector with radial segmentation of the invention may be seen from FIG. 2, wherein there is shown three different radiator arrangements with the most preferred being that of design #2, wherein the detector has three concentric cylinders with a total of 25 radiator tubes. Each cylinder of tubes has a different medium. For example, in design #2 containing three concentric cylinders, the outermost 16 tubes are filled with water plus a wavelength shifter; the middle concentric tube of 8 is filled with mineral oil; and the single center tube at the center axis is filled with mineral oil having dissolved therein a wavelength shifter. These outer, middle and inner cylinders have mediums with indices of refraction of: 1.36, 1.47 and 1.60 respectively so as to provide measurement of Cerenkov light in four to five dielectric media per event, thereby sampling radiation from different media. Events are triggered by cosmic particles, mainly muons, traversing one top scintillation counter of the TCDRS and one bottom scintillation counter within 5.0 ns. Each of the twenty-five PMTs, transfers the analog light signal, if any, to an ADC module. If the ADC modules were filled within the 5.0 ns gate; then the event is passed through the CAMAC system to LabView7, the data acquisition software. One millisecond later, the event of digitized pulse height data is archived on a 80 Gbyte internal hard disk. See FIG. 5 for an overview of the data acquisition system. More than 1.0 million events are collected by the TCDRS detector, in this report, and are processed for particle identification of electrons, and muons, pions, or protons. One million events represents 21.75 days or 313,200 s, 1000 events/s, and duty factor, requiring at least one muon/event, of 0.0032 to archive each event. See FIG. 3 for an overview of the TCDRS detector systems, which includes four plastic scintillators and twenty nine photomultiplier tubes and lucite radiator tubes.

EXAMPLE

The detector volume has twenty-five lucite tubes, each 0.80 m in diameter, 1.0 m in length, and capped with a 0.102 m, bialkali photomultiplier tube (PMT). Each tube is hermetically sealed and snuggly packed inside a black PVC pipe. The tubes are arranged in three concentric shells: an outer shell of sixteen tubes filled with 20.000 kg of de-ionized water and 0.002 kg of 7-Hydroxy-4methylcourmarin 97% (wavelength shifter); a middle shell of eight tubes filled with 19.600 kg of HYDROBRITE 380 PO (white mineral oil); and one tube, along the axis of symmetry, filled with 19.600 kg of white mineral oil and 0.002 kg of wavelength shifter. Adding wavelength shifter to about 68% of the tubes has a three-fold effect: A) produces more detectable light by shifting ultraviolet Cerenkov light into bright, blue light, peaked at 400 nm. The PMTs have peak response at 400 nm; B) creates a detector with material segmentation in the radial direction. Indices of refraction, from the outer shell to the detector center are 1.36, 1.47, and 1.6. This material segmentation produces 120 to 180 more photons than would be possible inside a detector of only one material; and C) eliminates the need to detect the entire Cerenkov cone and overcomes losses due to multiple reflections.

Events are triggered when a particle traverses the detector volume in 5.0 ns, the time of flight. A gated pulse is then created if at least one of two scintillation counters on top of the detector volume and at least one of two scintillation counters beneath the detector volume are struck. A gated pulse initializes the 8901A GPIB-to-CAMAC interface to read the ADC channel attached to each PMT. The GPIB, a full-function IEEE 488.2 controller, module transfers counts from each ADC channel to the data acquisition program, LabView7 on our desktop computer. LabView7 writes all counts from the ADC channels/event to an archived file, $10^6$ rows by 25 columns. Notice, there are $10^6$ events in this experiment and 25 detecting tubes. One million events represents 21.75 days or 313,200 s, 1000 events/s, and duty factor, requiring at least one muon/event, of 0.0032 to archive each event.

The goal of the TCDRS experiment is particle identification of charged particles for example electrons, muons, pions, or protons, using the particle velocity and the mass. Our analysis stream begins with the collection of ADC counts from each tube in an event; ADC counts then are converted into the mean number of photoelectrons/tube; tracks are assigned to groups of hits in each event, using beta-gamma, the range-energy-loss equation, and event display; momentum is assigned to each track; and likelihood functions are calculated for a particular particle hypothesis.

$$p = mc(\beta\gamma), \text{Range} = \int dE/(dE/dx)$$

Calculating the likelihoods for a given particle hypothesis:

$$L(i) = (0.3989/\sigma)\exp-[(p-p_i)^2/(2\sigma^2)]$$

Given:
  i: particle hypothesis (electron, muon, pion or proton)
  p: actual momentum measurement
  $p_i$: predicted momentum measurement
  $\sigma$: predicted error (1% momentum resolution)

In order to make a decision between particle hypotheses a likelihood ratio test is used.

$$R(i) = -2 \ln \{L(i)/(L(e)+L(\mu)+L(\pi)+L(p))\}$$

The likelihood ratio is based upon a $\chi^2$ statistic with one degree of freedom. If the ratio $R(i)>2.7$, then the hypothesis is rejected at the 90% confidence level.

Table 1. summarizes the channel location of identified particles with fitted mass and standard deviations. Confidence levels (1−CL)<90. represent ambiguous identification of the particle hypothesis.

TABLE 1

Invariant Mass of Detected Particle

| SHELL # | MASS (GeV/c$^2$) | MASS ERROR | SIGNAL/NOISE | (1-CL) |
|---|---|---|---|---|
| 111 CH1 electrons | 5.109e−04 | ±0.2e−05 | 132.00 | 93.2 |
| 111 CH1 pions | 0.139 | ±3.4e−03 | 0.89 | 25.1 |
| 11 CH2-CH9 electrons | 5.109e−04 | ±0.25e−05 | 88.01 | 93.3 |
| 1 CH10-CH18 protons | 0.938 | ±3.4e−03 | 3.01 | 91.5 |
| 1 CH19-CH25 muons | 0.106 | ±1.5e−03 | 8.19 | 90.2 |

Step(I)

The analysis process began with 1 M event triggers. Charge counts in each ADC were converted into the mean number of photons collected in the corresponding PMT:

$$<Nphotons> = 5 \times 10^{-7}(cnts)^3 - 0.0016(cnts)^2 + 1.8533(cnts) - 3.3000$$

where (cnts)=ADC counts

When each of the twenty five tubes had the ADC channel pedestal zeroed and one or more hits were required in tubes 19 through 25; the number of events reduced to 150,000. This restriction on the data permitted the identification of muon candidates in each event.

Step(II)

Each track has a path length L(x) with the number of photons detected in one or more radiator tubes. Given the index of refraction n for each traversed medium, β is calculated:

$$\beta = \frac{1}{\sqrt[n]{\left(1 - \frac{<Npe>}{L(x)}\right)}};$$

Step(III)

The kinematic expression for βγ becomes.

$$(\beta\gamma)_i = \frac{\beta_i}{\sqrt{1-\beta_i}}; \quad \ldots \quad i = medium$$

Number of events at this stage of analysis equals 150,000.

Step(IV)

The range particle range in a material is related to the particle energy loss due to ionization of the atoms in the medium. Lighter particles, for example electrons, may loose all kinetic energy and stop in the medium; whereby heavier, relativistic particles, for example muons weakly interact with nuclear matter and range for hundreds of kilometers without stopping. The range/particle mass formula equals:

$$R/m = \int \left(\frac{1}{\left(\frac{dE}{dx}\right)}\right) dE$$

Step(V)

We calculate the particle momentum by multiplying the particle mass and βγ:

$$P = m\beta\gamma$$

FIG. I is a Cerenkov radiator having a cylinder with windows at both ends and an enclosed pressurized gas chamber.

FIG. II shows the MC data in the TCDRS.

FIG. III shows the experimental data collected at a rate of 20 events per minute and the analysis stream.

FIG. 1 is a graph showing the various stratifications of atmosphere from the ionosphere to the earth, where approximately 80% of the cosmic particles known as muons and 20% of the particles result from multiple electromagnetic and strong interactions over 120 km.

FIG. 2 depicts the various radiator designs for the threshold Cerenkov detector with radial segmentation of the invention.

FIG. 3 depicts some of the hardware of the TCDRS, and includes four plastic scintillators and twenty nine photomultiplier tubes.

The concentric radiator design system through which data timing and data acquisition takes place is shown in FIG. 4.

FIG. 5 is a collection of graphs showing detected electron, momentum distribution and detected, pion momentum distribution.

A collection of graphs showing the momentum distribution for detected electrons and the momentum distribution for pion candidates is shown in FIG. 6.

FIG. 6 shows a collection of graphs depicting the momentum distribution, electron momentum distribution and muon momentum distribution.

A collection of graphs showing particle invariant mass distributions for detected electrons and candidates for pions is shown in FIG. 7.

FIG. 8 shows a collection of graphs showing invariant mass distribution for detected electrons, detected protons, pion candidates and detected muons.

A collection of graphs showing event reconstruction or tracking of events for detected electrons, detected muons, pion candidates, and detected protons as shown in FIG. 9.

FIG. 10 is a collection of graphs showing tracking of events for detected electrons, detected muons, pion candidates, and detected protons in establishment of the results of the TCDRS of the invention.

The TCDRS is a unique design that is able to identify particle tracks as they pass through the radiator and will be able to sample Cerenkov radiation produced by charged particles with momentum up to 5 GeV/c.

The radiator contains three concentric rings each with a different dielectric medium ($n_1$=1.36, $n_2$=1.47, $n_3=1.60$). The three rings are design to produce more photons as the particle travels into the TCDRS and fewer photons as it leaves.

The correlation between the number of photons produced in the rings and the particle momentum allowed to separate $\pi$, $\mu$, K and p up to 4 to 5 GeV/c.

The TCDRS is going to increase the sensitivity of particle identification for threshold Cerenkov detectors.

We claim:

1. A method of providing nuclear particle identification for e, $\mu$, $\pi$, and p of up to about 4 to about 5 GeV/c using an improved Threshold Cerenkov Detector With Radial Segmentation (TCDRS), comprising:
    A) Allowing particles of e, $\mu$, $\pi$, and p to impinge on a plurality of at least three concentrically configured light transmitting radiator tubes; wherein: i) an outer shell of radiator tubes is filled with water and a wavelength shifter to provide a first index of refraction; ii) a middle shell of said radiator tubes is filled with mineral oil to provide a second index of refraction higher than said first index of refraction; and iii) a center shell of said radiator tubes is filled with mineral oil and a wave length shifter to provide a third index of refraction higher than said second index of refraction;
    B) Obtaining light flashes of materially segmented blue light in a radial direction shifted from ultraviolet Cerenkov light by said wavelength shifter and materially segmented into a plurality of photons by said different indices of refraction in said concentrically configured radiator tubes; and
    C) Counting particles as an event when a gated impulse is created when at least one of two scintillation counters on top of said detector and at least one of two scintillation counters beneath said detector are struck when a particle traverses the detector volume to create a blue photon that is multiplied by an attached photomultiplier tube.

2. The process of claim 1 wherein an event is triggered when a particle traverses said detector volume in 5 ns.

3. The process of claim 1 wherein said wavelength shifter is 7-hydroxy-4-methylcoumarin.

4. The process of claim 3 wherein said wavelength shifter is added to about 68% of said light transmitting radiator tubes.

5. The process of claim 4 wherein said materially segmented blue light peaks at about 400 nm.

6. The process of claim 5 wherein said gated impulse initiates a computer aided interface to read analog-to-digital converter (ADC) channels attached to each photomultiplier tube and transfers counts from each ADC to a data acquisition program on a computer.

7. The process of claim 6 wherein said data acquisition program on said computer writes all counts from said ADC channels of events to an archived file.

8. In a Threshold Cerenkov Detector, the improvement of a Radial Segmentation design that provides nuclear particle identification for e, $\mu$, $\pi$, and p of up to about 4 to about 5 GeV/c by allowing particles of e, $\mu$, $\pi$, and p to impinge on said design, to obtain light flashes of materially segmented blue light into a radial direction shifted from UV Cerenkov light by a wavelength shifter and materially segmented into a plurality of photons by different indices of refraction in concentrically configured radiator tubes, said design comprising:
    A) A plurality of at least three concentrically configured light transmitting radiator tubes comprising;
        i) An outer shell of radiator tube means filled with water and a wavelength shifter to provide a first index of refraction;
        ii) a middle shell of radiator tube means filled with mineral oil to provide a second index of refraction higher than said first index of refraction; and
        iii) a center shell of radiator tube means filled with mineral oil and a wavelength shifter to provide a third index of refraction higher than said second index of refraction; and
    B) at least one of two scintillation counter means disposed on top of said detector and at least one of two scintillation counter means disposed on the bottom of said detector to provide a gated impulse when struck by a particle traversing the detector volume to create a blue photon multiplied by an attached photomultiplier tube.

* * * * *